United States Patent
Panttila et al.

(10) Patent No.: US 12,409,861 B2
(45) Date of Patent: *Sep. 9, 2025

(54) VISIBILITY CONDITION DETERMINATIONS FOR AUTONOMOUS DRIVING OPERATIONS

(71) Applicant: TuSimple, Inc., San Diego, CA (US)

(72) Inventors: John E. Panttila, Tucson, AZ (US); Zhujia Shi, San Diego, CA (US); Riad I. Hammoud, San Diego, CA (US); Arda Kurt, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 17/968,729

(22) Filed: Oct. 18, 2022

(65) Prior Publication Data

US 2023/0049018 A1 Feb. 16, 2023

Related U.S. Application Data

(63) Continuation of application No. 16/938,251, filed on Jul. 24, 2020, now Pat. No. 11,505,213.

(51) Int. Cl.
*B60W 60/00* (2020.01)

(52) U.S. Cl.
CPC .. *B60W 60/00182* (2020.02); *B60W 60/0016* (2020.02); *B60W 2420/408* (2024.01); *B60W 2552/53* (2020.02); *B60W 2555/20* (2020.02)

(58) Field of Classification Search
CPC ....... B60W 60/00182; B60W 60/0016; B60W 2420/408; B60W 2552/53;

(Continued)

(56) References Cited

U.S. PATENT DOCUMENTS

| 2007/0276599 A1 | 11/2007 | Ogawa |
| 2009/0326752 A1 | 12/2009 | Staempfle |

(Continued)

FOREIGN PATENT DOCUMENTS

| DE | 19943611 A1 | 3/2001 |
| DE | 102013221133 A1 | 5/2015 |

(Continued)

OTHER PUBLICATIONS

Hiscocks, P., Measuring Luminance with a Digital Camera, Syscomp Electronic Design Limited, Feb. 16, 2014, available at https://www.ee.ryerson.ca/~phiscock/astronomy/light-pollution/luminance-notes-2.pdf.

(Continued)

*Primary Examiner* — James J Lee
*Assistant Examiner* — Alexander George Matta
(74) *Attorney, Agent, or Firm* — Perkins Coie LLP

(57) ABSTRACT

Techniques are described for determining visibility conditions of an environment in which an autonomous vehicle is operated and performing driving related operations based on the visibility conditions. An example method of adjusting driving related operations of a vehicle includes determining, by a computer located in an autonomous vehicle, a visibility related condition of an environment in which the autonomous vehicle is operating, adjusting, based at least on the visibility related condition, a set of one or more values of one or more variables associated with a driving related operation of the autonomous vehicle, and causing the autonomous vehicle to be driven to a destination by causing the driving related operation of one or more devices located in the autonomous vehicle based on at least the set of one or more values.

19 Claims, 3 Drawing Sheets

(58) Field of Classification Search
CPC ....... B60W 2555/20; B60W 2420/403; B60W 60/0015; B60W 2556/50; B60W 2720/10; B60W 50/0098; B60W 2050/0083; B60W 2754/30; G01S 17/931; G01S 17/86; G01S 17/89; G01S 17/95

See application file for complete search history.

(56) References Cited

U.S. PATENT DOCUMENTS

| | | | |
|---|---|---|---|
| 2014/0081507 A1* | 3/2014 | Urmson | B60W 40/06 701/28 |
| 2014/0307247 A1* | 10/2014 | Zhu | B60W 40/064 342/54 |
| 2015/0178902 A1* | 6/2015 | Lee | G06T 5/77 382/104 |
| 2015/0371093 A1* | 12/2015 | Tamura | G06T 7/593 382/103 |
| 2018/0148053 A1 | 5/2018 | Lee et al. | |
| 2018/0164119 A1* | 6/2018 | Becker | B60W 60/001 |
| 2019/0094136 A1 | 3/2019 | Juette | |
| 2019/0212725 A1 | 7/2019 | Woodrow et al. | |
| 2019/0248381 A1 | 8/2019 | Yu | |
| 2019/0383627 A1* | 12/2019 | Nangeroni | B60W 50/0098 |
| 2020/0064839 A1* | 2/2020 | Oyama | B60W 60/00186 |
| 2020/0071144 A1* | 3/2020 | Draayer | B66F 9/0759 |
| 2020/0166352 A1* | 5/2020 | An | B60W 30/18154 |
| 2020/0183386 A1 | 6/2020 | Creusot | |
| 2021/0031804 A1* | 2/2021 | Oyama | B60W 60/0025 |
| 2022/0024492 A1 | 1/2022 | Panttila et al. | |

FOREIGN PATENT DOCUMENTS

| | | |
|---|---|---|
| DE | 102016203833 A1 | 9/2017 |
| DE | 102018219103 A1 | 5/2020 |
| EP | 2154043 A1 | 2/2010 |

OTHER PUBLICATIONS

Plenk, Rupert. European Application No. 21187251.0-1012, Partial Search Report Mailed Dec. 7, 2021, pp. 1-14.

European Patent Office, Extended European search report for EP 21187251, Mailing Date: Mar. 11, 2022, 11 pages with English translation.

Hanada, "Apparatus of outputting time to be required for passing through intersection, and program of outputting time to be required for passing through intersection", (Jan. 24, 2008, English machine translation of JP2008-15670 A (Year: 2008).

Stadler, "Method and system for initiating a safety precaution of a motor vehicle and motor vehicle", Jan. 9, 2020, English machine translation of DE 102018210885 A1 (Year: 2020).

* cited by examiner

VISIBILITY CONDITION DETERMINATIONS FOR AUTONOMOUS DRIVING OPERATIONS

CROSS-REFERENCE TO RELATED APPLICATIONS

This application is a continuation of U.S. patent application Ser. No. 16/938,251, filed on Jul. 24, 2020. The aforementioned application is incorporated by reference in its entirety.

TECHNICAL FIELD

This document relates to systems, apparatus, and methods to determine visibility conditions to perform autonomous driving related operations.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

When a vehicle is driven, the vehicle's operations is dependent at least in part on the environment in which the vehicle is operated. This patent document describes systems, apparatus, and methods to determine visibility conditions of the environment in which the vehicle operates to perform autonomous driving related operations on the vehicle.

In an example embodiment, a method of autonomous driving operation comprises determining, by a computer located in an autonomous vehicle, a visibility related condition of an environment in which the autonomous vehicle is operating; adjusting, based at least on the visibility related condition, a set of one or more values of one or more variables associated with a driving related operation of the autonomous vehicle; and causing the autonomous vehicle to be driven to a destination by causing the driving related operation of one or more devices located in the autonomous vehicle based on at least the set of one or more values.

In some embodiments, the determining the visibility related condition includes: performing a first determination, based on sensor data provided by a light sensor, that an amount of light of the environment is less than a threshold value, where the light sensor is located on or in the autonomous vehicle; and performing a second determination, in response to the first determination, that the environment is associated with a bad visibility condition, where the set of one or more values are adjusted to be same as a second set of one or more values associated with the bad visibility condition. In some embodiments, the determining the visibility related condition includes: performing a first determination, based on an image provided by a camera, that an amount of light of the environment is less than a threshold value, where the camera is located on or in the autonomous vehicle; and performing a second determination, in response to the first determination, that the environment is associated with a bad visibility condition, where the set of one or more values are adjusted to be same as a second set of one or more values associated with the bad visibility condition. In some embodiments, the determining the visibility related condition includes: performing a first determination, based on a senor data provided by a light sensor or a camera, that an amount of light of the environment is greater than or equal to a threshold value, where the light sensor or the camera is located on or in the autonomous vehicle; and performing a second determination, in response to the first determination, that the environment is associated with a good visibility condition, where the set of one or more values are adjusted to be same as a third set of one or more values associated with the good visibility condition.

In some embodiments, the determining the visibility related condition includes: performing a first determination, based on information provided by a global positioning system (GPS) transceiver located on the autonomous vehicle, that the autonomous vehicle is operating within a range of a first distance and a second distance of a traffic intersection, where the first distance is different from the second distance; performing a second determination that a traffic light is not detected in images provided by a camera located on or in the autonomous vehicle when the autonomous vehicle is operated with the range of the first distance and the second distance; and performing a third determination, in response to the first determination and the second determination, that the environment is associated with a bad visibility condition, where the set of one or more values are adjusted to be same as a second set of one or more values associated with the bad visibility condition. In some embodiments, the determining the visibility related condition includes: performing a first determination, based on information provided by a global positioning system (GPS) transceiver located on the autonomous vehicle, that the autonomous vehicle is operating within a range of a first distance and a second distance of a traffic intersection, where the first distance is different from the second distance; performing a second determination that a traffic light is detected in images provided by a camera located on or in the autonomous vehicle when the autonomous vehicle is operated with the range of the first distance and the second distance; and performing a third determination, in response to the first determination and the second determination, that the environment is associated with a good visibility condition, where the set of one or more values are adjusted to be same as a third set of one or more values associated with the good visibility condition.

In some embodiments, the first distance and the second distance are based on a number of vehicles located within a distance in front of the autonomous vehicle. In some embodiments, the determining the visibility related condition includes: performing a first determination, based on an image provided by a camera, that a number of lane markers located on a road within a distance of a location of the autonomous vehicle is less than a threshold value, where the camera is located on or in the autonomous vehicle; and performing a second determination, in response to the first determination, that the environment is associated with a bad visibility condition, where the set of one or more values are adjusted to be same as a second set of one or more values associated with the bad visibility condition. In some embodiments, the determining the visibility related condition includes: performing a first determination, based on a point cloud data provided by a light detection and ranging (LiDAR) sensor, that a number of lane markers located on a road within a distance of a location of the autonomous vehicle is less than a threshold value, where the LiDAR sensor is located on or in the autonomous vehicle; and performing a second determination, in response to the first determination, that the environment is associated with a bad visibility condition, where the set of one or more values are adjusted to be same as a second set of one or more values associated with the bad visibility condition.

In some embodiments, the determining the visibility related condition includes: performing a first determination, based on a point cloud data or an image respectively provided by a light detection and ranging (LiDAR) sensor or a camera, that a number of lane markers located on a road within a distance of a location of the autonomous vehicle is greater than or equal to a threshold value, where the LiDAR sensor or the camera is located on or in the autonomous vehicle; and performing a second determination, in response to the first determination, that the environment is associated with a good visibility condition, where the set of one or more values are adjusted to be same as a third set of one or more values associated with the good visibility condition. In some embodiments, the threshold value is based on a number of vehicles located within a distance in front of the autonomous vehicle. In some embodiments, the determining the visibility related condition includes determine whether the environment is associated with either a good visibility condition or a bad visibility condition based on a weather condition of the environment, and where the adjust the set of one or more values includes: adjusting the set of one or more values to be same as a second set of values associated with the good visibility condition, or adjusting the set of one or more values to be same as a third set of values associated with the bad visibility condition.

In some embodiments, the determining the visibility related condition includes determining whether the environment is associated with either a good visibility condition or a bad visibility condition based on a location of the autonomous vehicle, where the adjusting the set of one or more values includes: adjusting the set of one or more values to be same as a second set of values associated with the good visibility condition, or adjusting the set of one or more values to be same as a third set of values associated with the bad visibility condition. In some embodiments, the autonomous vehicle is determined to operate in the bad visibility condition in response to determining that the location of the autonomous vehicle is within a pre-determined distance of a canyon or a tunnel. In some embodiments, the determining the visibility related condition includes determining whether the environment is associated with either a good visibility condition or a bad visibility condition based on a date and time when the autonomous vehicle is operating in the environment, where the adjusting the set of one or more values includes: adjusting the set of one or more values to be same as a second set of values associated with the good visibility condition, or adjusting the set of one or more values to be same as a third set of values associated with the bad visibility condition.

In some embodiments, the one or more variables includes a maximum speed for the autonomous vehicle or a minimum distance between the autonomous vehicle and another vehicle located in a same lane as the autonomous vehicle and immediately in front of the autonomous vehicle. In some embodiments, the adjusting the set of one or more values is based the visibility related condition and a number of lanes on a road on which the autonomous vehicle is operating. In some embodiments, the causing the driving related operations of the one or more devices includes: sending instructions to apply brakes on the autonomous vehicle upon determining that a current speed of the autonomous vehicle is greater than a maximum speed or upon determining that a distance between the autonomous vehicle and another vehicle immediately in front of the autonomous vehicle is less than a minimum distance, and where the one or more values includes the maximum speed and the minimum distance.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
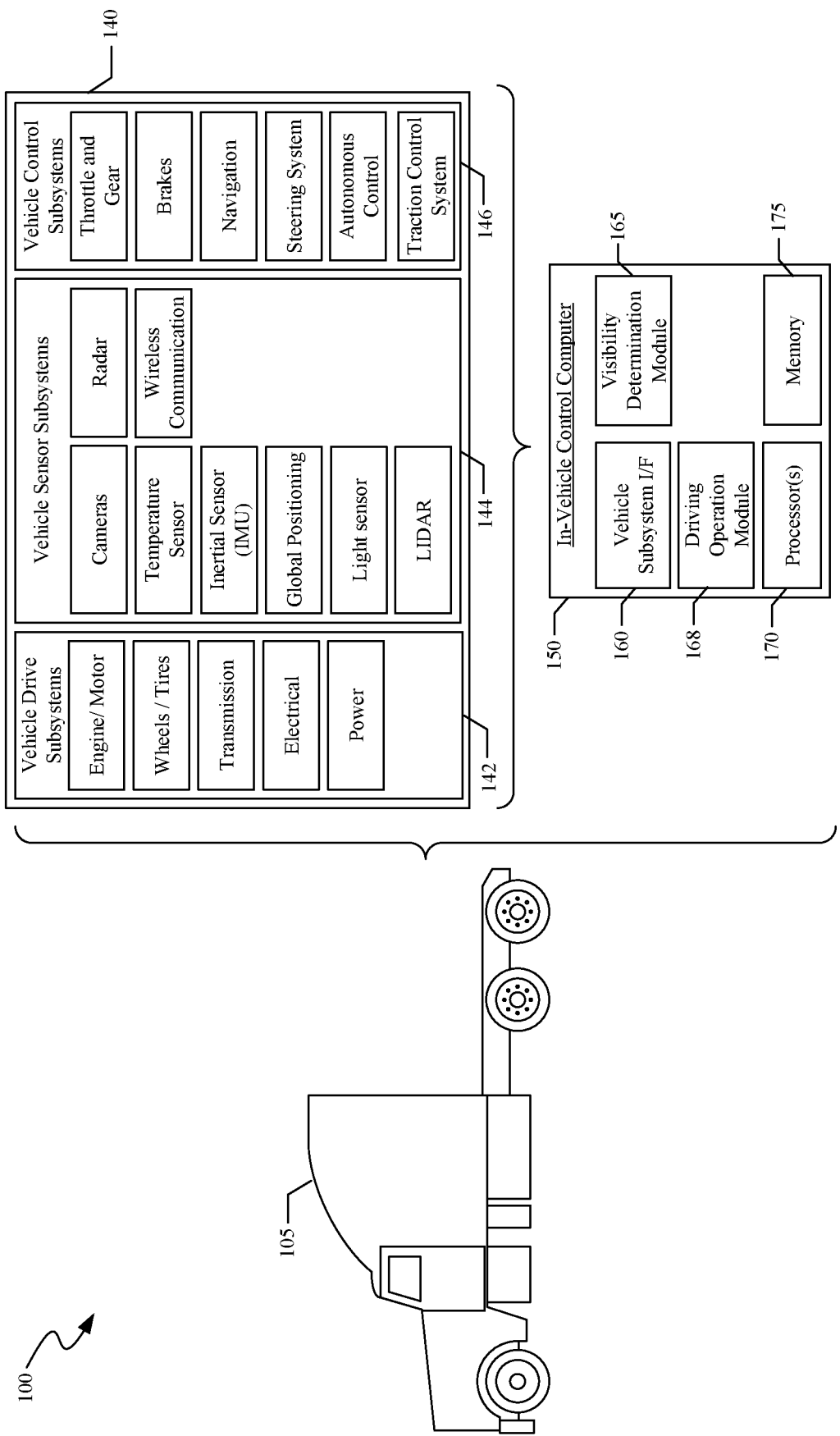
FIG. 1 shows a block diagram of an example vehicle ecosystem in which an in-vehicle control computer located in the vehicle can determine a visibility-related condition of an environment in which the vehicle is operating.

Developments in autonomous driving technology have led to a development of semi-trailer truck that can be autonomously driven to deliver goods to a destination. When a semi-trailer truck is driven to its destination, the semi-trailer truck can experience different types of environments that can affect its driving related operations. In an example scenario, an in-vehicle control computer located in a semi-trailer truck can determine that the semi-trailer truck is driven at night on a road having one lane. In this example scenario, the in-vehicle control computer can adjust one or more values of one or more driving related variables so that the semi-trailer truck can perform its driving related operations that are appropriate for night-time drawing driving on a road with limited number of lanes. In this example scenario, the value(s) of the driving related variable(s) can be different than those for a semi-trailer truck driven during the day on a highway with multiple lanes. The driving related variables may include, for example, a maximum speed of the semi-trailer truck or minimum distance between the semi-trailer truck and a vehicle immediately in front of the semi-trailer truck.

In another example scenario, the in-vehicle control computer can, based on determining visibility related characteristics of a semi-trailer truck's environment (e.g., fog, smoke, location in a canyon, detection of lane markers, etc.), adjust the driving related rules that can be used to perform driving related operations on the semi-trailer truck. The driving related rules can include, for example, normal driving rules, defensive rules, no lane change allowed rule, or a canyon driving rules. Each of the driving related rules can be pre-defined so that each rule can be associated with one or more pre-defined driving related variables and one or more corresponding values that can be pre-defined.

Section I of this patent document provides an overview of the devices/systems located on or in an autonomous vehicle, such as an autonomous semi-trailer truck. Section II of this patent document describes techniques to determine visibility-related conditions in an environment in which the semi-trailer truck operates. Section III of this patent document describes techniques employed by the in-vehicle control computer to adjust driving related operations based on the visibility-related conditions. The term "visible" or "visibility" can include, for example, lighting condition of the environment in which the semi-trailer truck operates, whether certain objects (e.g., traffic lane markers or traffic lights) are detected in images obtained from cameras onboard the semi-trailer truck, whether certain information about the environment in which the semi-trailer truck is operated is detected (e.g., location information by GPS onboard the semi-trailer truck or environment data obtained by sensors, such as cameras, onboard the semi-trailer truck), or a presence of a number of vehicle(s) located in front of the semi-trailer truck (e.g., indicating a heavy traffic condition). Section IV of this patent document describes technique employed by the in-vehicle control computer to adjust the driving related operations based on a condition of the semi-trailer truck (e.g., braking condition). The example headings for the various sections below are used to facilitate the understanding of the disclosed subject matter and do not limit the scope of the claimed subject matter in any way. Accordingly, one or more features of one example section can be combined with one or more features of another example section.

I. Autonomous Driving Ecosystem

FIG. 1 shows a block diagram of an example vehicle ecosystem 100 in which an in-vehicle control computer 150 located in the vehicle 105 can determine a visibility-related condition of an environment in which the vehicle 105 is operating. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 are shown as examples. In some embodiment, additional components or devices can be added to the various subsystems or one or more components or devices can be removed without affecting the visibility determination related features described in this patent document. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the vehicle 105 is operating or a condition of the vehicle 105. As further explained in this patent document, the visibility determination module 165 in the in-vehicle control computer 150 can determine the extent of the visibility of the environment based on information provided by sensors (e.g., light sensor or cameras) in the vehicle sensor subsystem 144. The vehicle sensor subsystem 144 may include one or more cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 144 may also include sensors configured to monitor internal systems of the vehicle 105 (e.g., an 02 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the environment in which the vehicle 105 is operating. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include one or more cameras configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the processor 170 to perform various methods and/or functions of the vehicle 105, including those described for the visibility determination module 165 and the driving operation module 168 as explained in this patent document. For instance, the processor 170 executes the operations associated with visibility determination module 165 for determining visibility of the environment in which the vehicle 105 operates based on sensor data, as further described in Section II. The processor 170 executes the operations associated with driving operation module 168 for determining various driving related operations of the vehicle 105 based on the visibility determined by the visibility determination module 165, as further described in Section III. In embodiments, the driving operation module 168 can adjust the driving related operations based on a condition of the vehicle 105, as described in Section IV.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Determining Visibility-Related Conditions

II.(a). Visibility Determinations Based on Amount of Light

The visibility determination module 165 can determine visibility related conditions of the environment in which the autonomous vehicle 105 is operating based on data received from one or more sensors that are part of the vehicle sensor subsystem 144. The data received from the one or more sensors can be analyzed by the visibility determination module 165 to determine the amount of light of the environment in which the autonomous vehicle 105 is operating.

In some embodiments, the visibility determination module 165 can receive sensor data from one or more cameras or a light sensor. The sensor data may include images obtained from the one or more cameras or an output value (e.g., voltage or resistance value) from the light sensor. In an example implementation, the visibility determination module 165 can determine the extent of light by analyzing the pixels of the images to determine the amount of light of the environment in which the autonomous vehicle 105 is operating. In another example implementation, the visibility determination module 165 can determine the amount of light based on the output value provided by the light sensor. If the amount of light is lower than a threshold value, then the visibility determination module 165 can determine that the vehicle 105 is operating in poor visibility conditions. The poor visibility conditions can be situations when the vehicle 105 is driving during evening or night time or when the vehicle is driving through a canyon or tunnel or in bad lighting conditions (e.g., fog).

II.(b). Visibility Determinations Based on Detection of Objects on the Road

Figure 2:
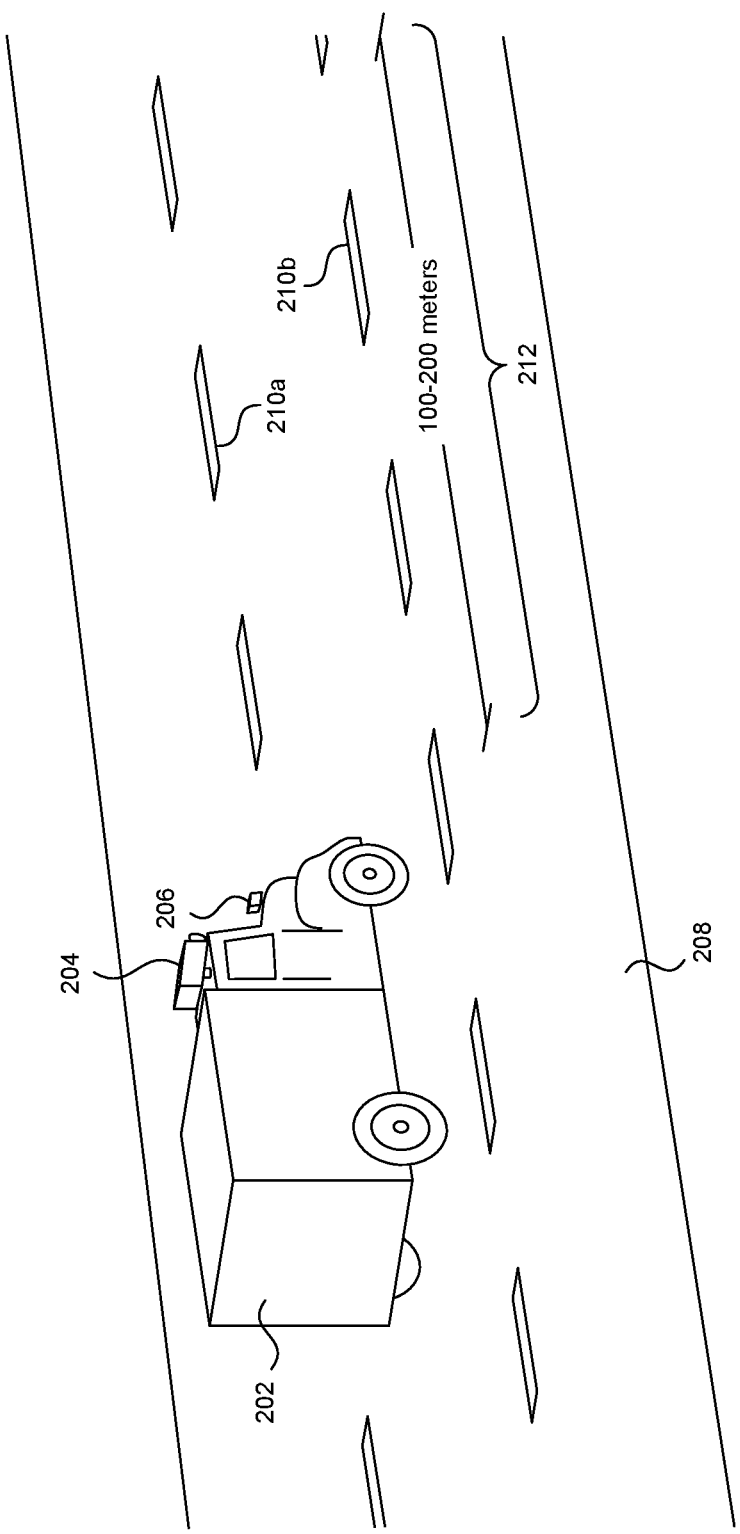
FIG. 2 shows an example scenario where an autonomous vehicle is driving on a lane on a road.

In some embodiments, the data received from the one or more sensors can be analyzed by the visibility determination module 165 to determine whether certain objects on the road (e.g., lane markers) are discernable from the sensor data. The visibility determination module 165 can determine visibility related conditions of the environment in which the autonomous vehicle 105 is operating based on whether certain objects located on the road (e.g., lane markers or traffic lights) are discernable. FIG. 2 shows an example scenario where an autonomous vehicle 202 is driving on a lane on a road 208. The lane on which the autonomous vehicle 202 is driven includes two sets of multiple lane markers—one set of multiple lane markers 210*a* are located on a first side of the lane and another set of multiple lane markers 210*b* are located on a second side of the lane opposite to the first side. The autonomous vehicle 202 includes a camera 204 and/or a LiDAR sensor 206 with which the visibility determination module can determine a presence of the lane markers over a distance from the location of the autonomous vehicle 202. The camera 204 and/or the LiDAR sensor 206 are structured to point to an area 212 in front the autonomous vehicle 202 so that the camera 204 and/or LiDAR sensor 206 can obtain sensor data (e.g., images or point cloud data) of the front area 212.

In one example implementation, the visibility determination module can receive an image from the camera 204 and can determine whether a number of lane markers greater than or equal to a threshold number of lane markers are present within a distance (e.g., 100 to 200 meters as shown in FIG. 2) in front of a location of the autonomous vehicle 202. The distance in front of a location of the autonomous vehicle 202 can be pre-determined. For example, the visibility determination module can determine that the image shows the presence of a total of six lane markers (three lane markers on each side of the lane) on the road over a distance of 120 meters. If the threshold number of lane markers is four, then the visibility determination module can determine that a good visibility condition exists since the visibility determination module determines the presence of six lane markers in the image from the camera 204. And, if the visibility determination module determines a presence of less than four lane markers over the example distance of 120 meters, then the visibility determination module can determine that a bad visibility condition exists for the example implementation where the threshold number of lane markers is four.

In another example implementation, the visibility determination module can receive sensor data (e.g., point cloud data) from the LiDAR sensor 206 and can determine whether a number of lane markers is greater than or equal to a threshold number of lane markers are present within a distance (e.g., 100 to 200 meters as shown in FIG. 2) in front of a location of the autonomous vehicle 202. The light reflected from the lane markers can indicate the presence of and the number of lane markers in the point cloud data over the distance in front of a location of the autonomous vehicle 202. For example, the visibility determination module can determine that over a distance of 200 meters, the point cloud data shows the presence of a total of eight lane markers (four lane markers on each side of the lane) on the road. If the threshold number of lane markers is six, then the visibility determination module can determine that a good visibility condition exists since the visibility determination module determines the presence of eight lane markers in the point cloud data from the LiDAR sensor 206. And, if the visibility determination module determines a presence of less than six lane markers over the example distance of 200 meters, then the visibility determination module can determine that a bad visibility condition exists for the example implementation where the threshold number of lane markers is six.

In yet another example implementation, the visibility determination module can determine whether a good visibility condition exists based on whether other objects on the road are discernable from the sensor data. For example, if the visibility determination module determines, based on location information provided by a GPS device located in the autonomous vehicle 202, that the autonomous vehicle 202 is traveling on a local road (e.g., not a highway), then the visibility determination module can determine whether a presence of a traffic light is detected from the sensor data (e.g., image data or point cloud data) when the autonomous vehicle 202 is within a range of distances (e.g., between 350 meters and 400 meters) of a traffic intersection. Having a range of distances, as opposed to a single distance, is a beneficial technical feature to prevent false positives. For example, if a single distance is used, then a presence of a traffic light detected when the autonomous vehicle 202 reaches 50 meters from the location of the traffic intersection can be considered a good visibility condition even though such a detection can be considered a bad visibility condition. To prevent such false positive outcomes, the range of distances (e.g., between 400 meters and 450 meters) can be used to determine whether a traffic light is detected when the autonomous vehicle 202 is within the range of distances. In some embodiments, the range of distances may be pre-determined.

In an implementation example, if the visibility determination module determines that the sensor data indicates a presence of a traffic light at the traffic intersection when the autonomous vehicle 202 is within 350 to 400 meters of a traffic intersection, then the visibility determination module determines a presence of a good visibility condition. And, if the visibility determination module determines that the sensor data does not indicate a presence of a traffic light at the traffic intersection when the autonomous vehicle 202 is within 400 meters of a traffic intersection, then the visibility determination module determines a presence of a bad visibility condition.

In some embodiments, visibility determination module may determine whether an image contains sufficient amount of relevant gray-scale or luminance values for object identification such as lane markers or traffic lights detectors to perform reasonably well by evaluating the visibility entropy of one or multiple images. For example, the visibility determination module may determine a presence of a lane marker or a traffic light in an image upon determining that a set of gray-scale values or a set of luminance values of an object in the image is associated with the lane marker or the traffic light. The visibility entropy calculations can be performed using the Shannon Entropy that can measure the overall uncertainty of a random variable. The visibility entropy determination can include determining a distribution of signals so that a bias in gain, contrast or homogeneity of the signal can be determined.

II.(c). Visibility Determinations Based on Weather Conditions, Time of Day and/or Location of the Autonomous Vehicle The visibility determination module 165 can determine visibility related conditions of the environment in which the autonomous vehicle 105 is operating based on the weather conditions, time of day and/or location of the autonomous vehicle 105.

In some embodiments, the in-vehicle control computer can receive weather conditions via a wireless transceiver located in the vehicle 105. The weather condition can indicate a weather of a region where the vehicle 105 is operated. Based on the indicated weather conditions, the visibility determination module 165 can determine whether a good or a bad visibility condition exists in a location where the vehicle 105 is operated. For example, if the weather condition indicates a rainy or snowy condition, the visibility determination module can determine that a bad visibility condition exists for the area in which the vehicle 105 is operated. In some embodiments, the in-vehicle control computer can repeatedly obtain weather conditions which may vary as the vehicle 105 drives from one location to another location. The visibility determination module can repeatedly and dynamically adjust the visibility determinations based on the most relevant weather information associated with the locations where the vehicle 105 is operating.

In some embodiments, a pre-determined time schedule stored in the in-vehicle control computer can indicate the times when a good visibility condition may be present and the times when a bad visibility condition may be present. In an example implementation, the pre-determined time schedule can be as shown in Table 1 below.

TABLE 1

Pre-determined time schedule for visibility determinations

| Dates | Times | Visibility Condition |
| --- | --- | --- |
| March 8 to November 1 | 7:00am to 6:00pm | Good |
| March 8 to November 1 | 6:01pm to 6:59am | Bad |
| November 2 to March 7 | 6:00am to 5:00pm | Good |
| November 2 to March 7 | 5:01pm to 5:59am | Bad |

Based on the time and/or date when the autonomous vehicle 105 is operating, the visibility determination module 165 can determine whether a good visibility condition exists or a bad visibility condition exists.

In some embodiments, the visibility determination module 165 can determine whether a good (or bad) visibility condition exists based on the location of the autonomous vehicle. For example, if the visibility determination module 165 determines, based on the location of the vehicle 105 obtained from a GPS device onboard the vehicle 105, that the vehicle 105 is within a distance of a location of a canyon or a tunnel, then the visibility determination module 165 can proactively adjust the visibility related determinations. For example, if the vehicle 105 is driving on a road on May 1 at 11 am, which can be considered a good visibility condition, and if the vehicle 105 is within a pre-determined distance of a tunnel (e.g., 100 meters), then the visibility determination module 165 can determine that the visibility condition is a bad visibility condition in anticipation of traveling through the tunnel so that the vehicle 105 can employ appropriate driving related operations (as further explained in Section II).

In some embodiments, the visibility determination module 165 can employ any combination of the techniques described above. For example, as explained above, the visibility determination module 165 can employ a pre-determined time schedule with a location of the vehicle 105 to more precisely determine a visibility condition of the environment where the vehicle 105 is (or will be) operating. In another example, the visibility determination module 165 can determine that the visibility condition is good based on a location of the vehicle 105 along with sensor data obtained from the cameras and/or LiDAR sensors (e.g., the visibility determination module 165 can determine that the visibility condition is good if the amount of light is greater than a threshold value even if the vehicle 105 is driving through a canyon location which can be associated with a bad visibility condition).

In some embodiments, the various threshold values or distance values (e.g., threshold value for amount of light or threshold number of lane markers or a distance in front of the location of the autonomous vehicle) can be pre-determined or can be dynamically adjusted when the vehicle 105 is driving. The visibility determination module can adjust the threshold values or distance values with which the visibility determination module determines whether a good or a bad visibility condition exists based on, for example, a presence of a number of vehicles in front of the vehicle 105. Using an example mentioned above, if the visibility determination module determines that an image from a camera shows the presence of a total of six lane markers (three lane markers on each side of the lane) on the road over a distance of 120 meters and if the visibility determination module determines that a number of vehicles within a distance (e.g., 200 meters) in front of the vehicle 105 is more than a threshold value (indicating a high-traffic scenario), then the visibility determination module can increase the threshold number of lane markers to eight. In this example, the visibility determination module can determine that a bad visibility condition exists by determining that the number of lane markers detected is less than the threshold number of lane markers.

Using another example mentioned above, if the visibility determination module determines that the vehicle 105 is operation on a local road (e.g., not a highway) and if the visibility determination module determines that a number of vehicles located within a distance of the vehicle 105 is less than a threshold value (indicating a low-traffic scenario), then the visibility determination module can decrease a range of the distances (e.g., from 350 to 400 meters to 250 meters to 300 meters). As explained above, if the visibility determination module determines that a traffic light is detected within the decreased range of distances, then the visibility determination module can determine that a good visibility condition exists. And if the visibility determination module determines that a traffic light is not detected within the decreased range of distances, then the visibility determination module can determine that a bad visibility condition exists.

The techniques employed by the visibility determination module 165 as explained in Section II can be performed repeatedly so that the driving related operations of the vehicle 105 can be appropriately managed given the various driving related conditions that the vehicle 105 may face as it travels from one location to another.

III. Adjusting Driving Related Operations Based on the Determined Visibility-Related Conditions The driving operation module 168 can adjust the driving related operations of the vehicle 105 so that vehicle 105 can be safely driven based on the visibility conditions determined the visibility determination module 165 as described in Section II. A driving related operation can include the driving operation module 168 sending commands to the engine, brakes, transmission, or steering to autonomously drive the vehicle 105. In some embodiments, the driving operation module 168 can adjust the driving related operations by adjusting one or more values of one or more driving related variables. For example, if the visibility determination module 165 determines that a bad visibility condition exists for the environment in which the vehicle 105 is operating, then the driving operation module 168 can adjust a maximum speed to be lower than that for a good visibility condition and/or the driving operation module 168 can adjust a minimum distance between the vehicle 105 and a vehicle immediately in front of and in the same lane as the vehicle 105 so that the minimum distance can be higher than that for a good visibility condition.

In some embodiments, the driving operation module 168 can refer to a pre-determined table (as shown in the example Table 2 below) that can include a list of pre-determined variables and a list of pre-determined values associated with the variables for both a good visibility condition and a bad visibility condition. The driving operation module 168 can adjust the driving related operations based on the one or more values by, for example, applying brakes to decrease the speed of the vehicle 105 upon determining that a current speed of the vehicle 105 is greater than the maximum speed or upon determining that a distance between the vehicle 105 and another vehicle immediately in front of the vehicle 105 is less than a minimum distance.

TABLE 2

Example of a Pre-determined Table of Variables for Visibility Conditions

| Variables | Good visibility condition | Bad visibility condition |
|---|---|---|
| Maximum speed | 65 mph (on highway) | 50 mph (on highway) |
| Minimum distance to vehicle in front of autonomous vehicle | 250 meters | 300 meters |
| Turn on headlights | No | Yes |
| Routing and navigation | All routes allowed | On local roads, avoid routes without traffic lights |

The driving operation module 168 can adjust the driving related operations by adjusting the value(s) associated with the driving-related variable(s). For example, using the example Table 2, if the visibility determination module determines that the visibility condition changes from good to bad, then the driving operation module 168 can adjust the maximum speed from 65 mph to 50 mph, increase the minimum distance from 250 meters to 300 meters, turn on headlights. In some embodiments, the minimum distance between the vehicle 105 and a vehicle immediately in front of and in the same lane as the vehicle 105 can be determined by using a time measurement. For example, a time measurement between the vehicle 105 and a vehicle immediately in front of the vehicle 105 can be 4 seconds for a good visibility condition and 6 seconds for a bad visibility condition. Based on the time measurements associated with the visibility conditions and based on a current speed of the vehicle 105, the driving operation module 168 can determine the minimum distance to the vehicle in front of the autonomous vehicle 105.

In some embodiments, if the visibility determination module determines that the vehicle 105 is operating in a bad visibility condition, then the driving operation module 168 can use Table 2 to determine routing and navigation to avoid routes without traffic lights if the vehicle 105 is operating on a local road (i.e., not on a highway). The routing and navigation used by the driving operation module 168 can be based on presence of traffic lights when a based visibility condition is determined so that the vehicle 105 can be operated on roads with traffic lights to improve safety. In some embodiments, other types of variables can be included in the pre-determined table of variables. For example, when a bad visibility condition is determined, the driving operation module 168 can use a pre-defined lane change variable that can indicate that the vehicle 105 can only perform lane changes in emergencies (e.g., to avoid other vehicles). In a related example, when a good visibility condition is determined, the driving operation module 168 can use a pre-defined lane change variable that can indicate that the vehicle 105 can perform as many lane changes as desired.

In some embodiments, the driving operation module 168 can refer to a pre-determined table (as shown in the example Table 3 below) that can include a list of pre-determined variables and a list of pre-determined values associated with the variables for both a good visibility condition and a bad visibility condition and for road types (e.g., multiple lanes versus single lane).

TABLE 3

Example of a Pre-determined Table of Variables for Visibility and Road Conditions

| Variables | Good visibility condition for multi-lane road | Bad visibility condition for multi-lane road | Good visibility condition for single lane road | Bad visibility condition for single lane road |
|---|---|---|---|---|
| Maximum speed | 65 mph (on highway) | 55 mph (on highway) | 60 mph (on highway) | 50 mph (on highway) |
| Minimum distance to vehicle in front of autonomous vehicle | 250 meters | 300 meters | 300 meters | 350 meters |
| Turn on headlights | No | Yes | Yes | Yes |
| Routing and navigation | All lanes/ routes allowed | Stay in merging lane | All lanes/ routes allowed | All lanes/ routes allowed |

Using the example Table 3, if the visibility determination module determines that the visibility condition changes from good to bad and if the visibility determination module determines that the vehicle 105 is operating on a road with multiple traffic lanes, then the driving operation module 168 can adjust the maximum speed from 65 mph to 55 mph, increase the minimum distance from 250 meters to 300 meters, turn on headlights and operate in the merging lane. The merging lane can include the right-most lane on the highway, where the right-most lane is the lane onto which vehicles merge when entering the highway.

In some embodiments, the driving operation module 168 can adjust the driving related operations by adjusting a driving related rule with which the in-vehicle control computer can instruct the various devices on the vehicle 105 to perform their driving related operations. A driving related rule can be based on the visibility condition determined by the visibility determination module 165 and/or additional criteria, such as a total number of traffic lanes including the lane on which the vehicle 105 is operating, or a number of vehicles within a pre-determined distance of the vehicle 105. Table 4 shows an example of a pre-determined table for driving related rules.

TABLE 4

Example of a Pre-determined Table for Driving Related Rules

| Variables | Normal Driving (Good visibility condition with normal traffic) | Defensive Driving (Bad visibility and/ or heavy traffic) | Canyon or Downhill Driving | Single Lane Road Driving or Autonomous Vehicle in merging lane |
|---|---|---|---|---|
| Maximum speed | 65 mph (on highway) | 55 mph (on highway) | 60 mph (on highway) | 50 mph (on highway) |
| Minimum distance to vehicle in front of autonomous vehicle | 250 meters | 300 meters | 300 meters | 350 meters |

TABLE 4-continued

Example of a Pre-determined Table for Driving Related Rules

| Variables | Normal Driving (Good visibility condition with normal traffic) | Defensive Driving (Bad visibility and/ or heavy traffic) | Canyon or Downhill Driving | Single Lane Road Driving or Autonomous Vehicle in merging lane |
|---|---|---|---|---|
| Turn on headlights | No | Yes | Yes | Yes |
| Routing and navigation | All lanes/ routes allowed | Stay in merging lane | Stay in merging lane | All lanes/ routes allowed |

Using the example values shown in Table 4, if the visibility determination module 165 determines a good visibility condition, and the if the visibility determination module 165 determines that a number of vehicles within a pre-determined distance in front of the vehicle 105 is less than a threshold value, then the driving operation module 168 can select a "Normal Driving" rule and the values for the variables shown in Table 4. The visibility determination module 168 can determine a "heavy traffic" condition (mentioned in the third column from left in Table 4) upon determining that a number of the vehicles within a pre-determined distance of a location of the vehicle 105 is more than a threshold value. The visibility determination module 168 can determine that a vehicle 105 is operating in a canyon or is driving downhill (mentioned in the fourth column from left in Table 4) based on information received from a GPS device located in the vehicle 105. The visibility determination module 168 can determine that the vehicle 105 is operating on a road having a single lane (mentioned in the fifth column from left in Table 4) based on sensor data provided by the camera(s) and/or LiDAR sensor located on the vehicle 105. The visibility determination module 168 can determine that the vehicle 105 is operating on a lane onto which one or more other vehicles can merge (mentioned in the fifth column from left in Table 4) based on sensor data provided by the camera(s) and/or LiDAR sensor located on the vehicle 105.

In some embodiments, one or more values of the one or more variables for each column can be adjusted based on a total weight hauled by the vehicle 105. For example, the visibility determination module can use the values in Tables 2 to 4 when the visibility determination module determines that the vehicle 105 has a weight greater than a threshold value (e.g., weight of vehicle is 70,000 lbs. and threshold value is 60,000 lbs.). In another example, the values in Tables 2 to 4 can be adjusted if the visibility determination module determines that the weight of the vehicle is lower than the threshold value. In an example implementation, using the "normal driving" condition of Table 4, the vehicle determination module can decrease the minimum threshold to 200 meters upon determining that the weight of the vehicle is lower than the threshold value and can keep the maximum speed to 65 mph so as to not exceed the speed limit. In some embodiments, the maximum speeds indicated in Tables 2 to 4 can be adjusted based on the speed limits of various local roads or state laws, which can be provided by GPS information.

Based on the driving related conditions determined (e.g., canyon driving) by the visibility determination module 165, the driving operation module 168 can select one or more values of one or more variables associated with the determined driving related condition. The driving operation module 168 can send instructions to one or more devices (e.g., engine, brakes, transmission) based on the one or more values of the one or more variables.

IV. Adjusting Driving Related Operations Based on the Condition of the Autonomous Vehicle The driving operation module 168 can adjust the driving related operations based on a condition of the semi-trailer truck. For example, the driving operation module 168 can monitor whether brakes are performing as desired by comparing an amount of brakes applied to a stopping distance that can be measured by the sensor data provided by the sensors (e.g., images provided by a camera). If the driving operation module 168 determines that the stopping distance is greater than an expected stopping distance for the applied amount of brakes, then the driving operation module 168 can change the value(s) of the variables indicated in Table 4 from a "normal driving" condition to a "defensive driving" condition. In some embodiments, a specific value associated with a driving related operation can be changed for a specific condition of the semi-trailer truck. Using the above-mentioned above, if the driving operation module 168 determines that the stopping distance is greater than an expected stopping distance for the applied amount of brakes, then the driving operation module 168 can increase the value of the "minimum distance to vehicle in front of autonomous vehicle" shown in Tables 2 to 4.

In some embodiments, a LiDAR sensor can be used to improve visibility when a bad visibility condition is determined. A LiDAR sensor can be used to detect objects though bad visibility conditions such as a fog. Thus, for example, a driving operation module 168 can use the point cloud data provided by LiDAR sensors to obtain visibility information when the visibility determination module 168 determines that the visibility is bad.

Figure 3:
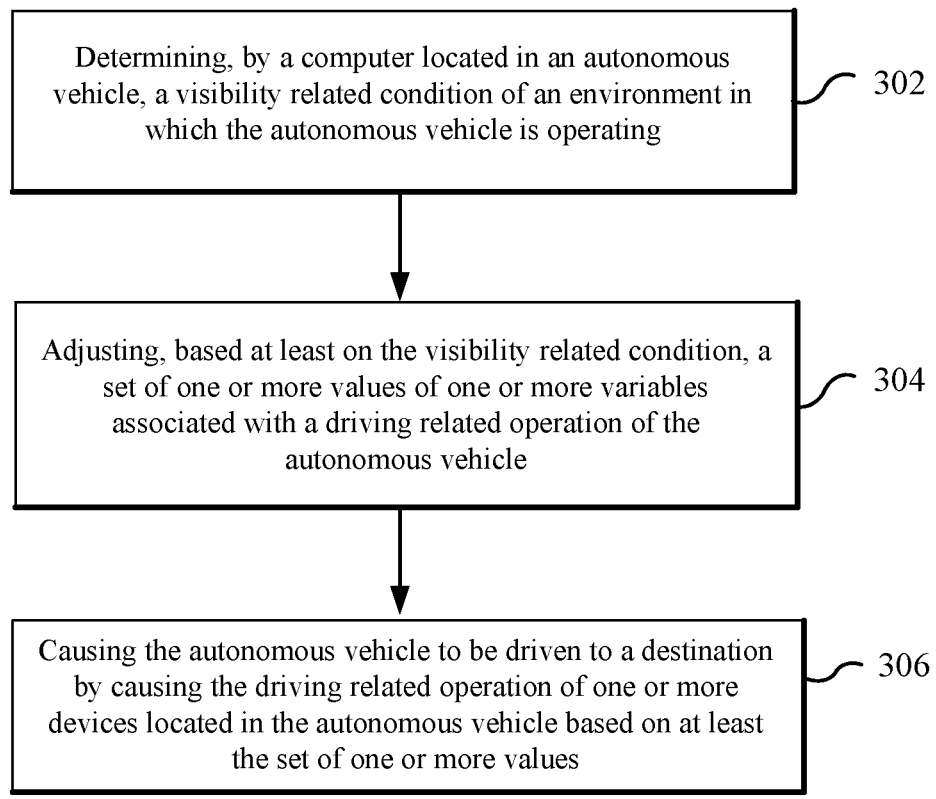
FIG. 3 shows a flow diagram for performing driving related operations of an autonomous vehicle based on a visibility condition.

FIG. 3 shows a flow diagram for performing driving related operations of an autonomous vehicle based on a visibility condition. Operation 302 includes determining, by a computer located in an autonomous vehicle, a visibility related condition of an environment in which the autonomous vehicle is operating. Operation 304 includes adjusting, based at least on the visibility related condition, a set of one or more values of one or more variables associated with a driving related operation of the autonomous vehicle. Operation 306 includes causing the autonomous vehicle to be driven to a destination by causing the driving related operation of one or more devices located in the autonomous vehicle based on at least the set of one or more values.

In some embodiments, the determining the visibility related condition includes: performing a first determination, based on sensor data provided by a light sensor, that an amount of light of the environment is less than a threshold value, where the light sensor is located on or in the autonomous vehicle; and performing a second determination, in response to the first determination, that the environment is associated with a bad visibility condition, where the set of one or more values are adjusted to be same as a second set of one or more values associated with the bad visibility condition. In some embodiments, the determining the visibility related condition includes: performing a first determination, based on an image provided by a camera, that an amount of light of the environment is less than a threshold value, where the camera is located on or in the autonomous vehicle; and performing a second determination, in response to the first determination, that the environment is associated with a bad visibility condition, where the set of one or more values are adjusted to be same as a second set of one or more values associated with the bad visibility condition.

In some embodiments, the determining the visibility related condition includes: performing a first determination, based on a senor data provided by a light sensor or a camera, that an amount of light of the environment is greater than or equal to a threshold value, where the light sensor or the camera is located on or in the autonomous vehicle; and performing a second determination, in response to the first determination, that the environment is associated with a good visibility condition, where the set of one or more values are adjusted to be same as a third set of one or more values associated with the good visibility condition. In some embodiments, the determining the visibility related condition includes: performing a first determination, based on information provided by a global positioning system (GPS) transceiver located on the autonomous vehicle, that the autonomous vehicle is operating within a range of a first distance and a second distance of a traffic intersection, where the first distance is different from the second distance; performing a second determination that a traffic light is not detected in images provided by a camera located on or in the autonomous vehicle when the autonomous vehicle is operated with the range of the first distance and the second distance; and performing a third determination, in response to the first determination and the second determination, that the environment is associated with a bad visibility condition, where the set of one or more values are adjusted to be same as a second set of one or more values associated with the bad visibility condition.

In some embodiments, the determining the visibility related condition includes: performing a first determination, based on information provided by a global positioning system (GPS) transceiver located on the autonomous vehicle, that the autonomous vehicle is operating within a range of a first distance and a second distance of a traffic intersection, where the first distance is different from the second distance; performing a second determination that a traffic light is detected in images provided by a camera located on or in the autonomous vehicle when the autonomous vehicle is operated with the range of the first distance and the second distance; and performing a third determination, in response to the first determination and the second determination, that the environment is associated with a good visibility condition, where the set of one or more values are adjusted to be same as a third set of one or more values associated with the good visibility condition.

In some embodiments, the first distance and the second distance are based on a number of vehicles located within a distance in front of the autonomous vehicle. In some embodiments, the determining the visibility related condition includes: performing a first determination, based on an image provided by a camera, that a number of lane markers located on a road within a distance of a location of the autonomous vehicle is less than a threshold value, where the camera is located on or in the autonomous vehicle; and performing a second determination, in response to the first determination, that the environment is associated with a bad visibility condition, where the set of one or more values are adjusted to be same as a second set of one or more values associated with the bad visibility condition. In some embodiments, the determining the visibility related condition includes: performing a first determination, based on a point cloud data provided by a light detection and ranging (LiDAR) sensor, that a number of lane markers located on a road within a distance of a location of the autonomous vehicle is less than a threshold value, where the LiDAR sensor is located on or in the autonomous vehicle; and performing a second determination, in response to the first determination, that the environment is associated with a bad visibility condition, where the set of one or more values are adjusted to be same as a second set of one or more values associated with the bad visibility condition.

In some embodiments, the determining the visibility related condition includes: performing a first determination, based on a point cloud data or an image respectively provided by a light detection and ranging (LiDAR) sensor or a camera, that a number of lane markers located on a road within a distance of a location of the autonomous vehicle is greater than or equal to a threshold value, where the LiDAR sensor or the camera is located on or in the autonomous vehicle; and performing a second determination, in response to the first determination, that the environment is associated with a good visibility condition, where the set of one or more values are adjusted to be same as a third set of one or more values associated with the good visibility condition. In some embodiments, the threshold value is based on a number of vehicles located within a distance in front of the autonomous vehicle.

In some embodiments, the determining the visibility related condition includes determine whether the environment is associated with either a good visibility condition or a bad visibility condition based on a weather condition of the environment, and where the adjusting the set of one or more values includes: adjusting the set of one or more values to be same as a second set of values associated with the good visibility condition, or adjusting the set of one or more values to be same as a third set of values associated with the bad visibility condition.

In some embodiments, the determining the visibility related condition includes determining whether the environment is associated with either a good visibility condition or a bad visibility condition based on a location of the autonomous vehicle, where the adjust the set of one or more values includes: adjust the set of one or more values to be same as a second set of values associated with the good visibility condition, or adjust the set of one or more values to be same as a third set of values associated with the bad visibility condition. In some embodiments, the autonomous vehicle is determined to operate in the bad visibility condition in response to determining that the location of the autonomous vehicle is within a pre-determined distance of a canyon or a tunnel. In some embodiments, the determining the visibility related condition includes determining whether the environment is associated with either a good visibility condition or a bad visibility condition based on a date and time when the autonomous vehicle is operating in the environment, where the adjusting the set of one or more values includes: adjusting the set of one or more values to be same as a second set of values associated with the good visibility condition, or adjusting the set of one or more values to be same as a third set of values associated with the bad visibility condition.

In some embodiments, the one or more variables includes a maximum speed for the autonomous vehicle or a minimum distance between the autonomous vehicle and another vehicle located in a same lane as the autonomous vehicle and immediately in front of the autonomous vehicle. In some embodiments, the adjusting the set of one or more values is based the visibility related condition and a number of lanes on a road on which the autonomous vehicle is operating. In some embodiments, the causing the driving related operations of the one or more devices includes: sending instructions to apply brakes on the autonomous vehicle upon determining that a current speed of the autonomous vehicle is greater than a maximum speed or upon determining that a distance between the autonomous vehicle and another vehicle immediately in front of the autonomous vehicle is less than a minimum distance, and where the one or more values includes the maximum speed and the minimum distance.

In this document the term "exemplary" is used to mean "an example of" and, unless otherwise stated, does not imply an ideal or a preferred embodiment. In the patent document the term "semi-trailer truck" is used to describe features of the visibility determination and the driving operation of the semi-trailer truck. However, the visibility determination techniques described can be applied to other kinds of vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of operating a vehicle, comprising:
receiving, by a computer located in the vehicle, an image provided by a camera located on or in the vehicle operating on a road;
performing a first determination, from the image, that a number of lane markers located on the road within a distance from a location of the vehicle is less than a threshold value;
adjusting, in response to the first determination, a first set of one or more values of one or more variables associated with a driving related operation of the vehicle, wherein the first set of one or more values are adjusted to be same as a second set of one or more values associated with a bad visibility condition; and
causing the driving related operation of one or more devices located in the vehicle based on at least the first set of one or more values, wherein the causing the driving related operation causes the vehicle to be driven to a destination;
wherein the second set of one or more values associated with the bad visibility condition indicates that the vehicle is to avoid driving on a route without traffic lights on a local road.

2. The method of claim 1, further comprising:
performing a second determination that number of lane markers located on the road within the distance of the location of the vehicle is greater than or equal to the threshold value
adjusting, in response to the second determination, the first set of one or more values to be same as a third set of one or more values associated with a good visibility condition.

3. The method of claim 1,
wherein the vehicle is operated on a lane of the road,
wherein the lane comprises a first set of multiple lane markers on one side of the lane and a second set of multiple lane markers on a second side of the lane, and wherein the lane markers include at least some of the first set of multiple lane markers and the second set of multiple lane markers.

4. The method of claim 1,
wherein the first set of one or more values of the one or more variables includes a first value of a maximum speed,
wherein in response to the adjusting the first set of one or more values to be same as the second set of one or more values associated with the bad visibility condition, the first value of the maximum speed associated with the bad visibility condition is lower than that for a good visibility condition.

5. The method of claim 1,
wherein the first set of one or more values of the one or more variables includes a second value of a minimum distance between the vehicle and a second vehicle located in front of the vehicle,
wherein in response to the adjusting the first set of one or more values to be same as the second set of one or more values associated with the bad visibility condition, the second value of the minimum distance associated with the bad visibility condition is higher than that for a good visibility condition.

6. The method of claim 1, wherein the causing the driving related operation of the one or more devices includes:
sending instructions to apply brakes on the vehicle upon determining that a current speed of the vehicle is greater than a first value of a maximum speed associated with the bad visibility condition.

7. The method of claim 1, wherein the causing the driving related operation of the one or more devices includes:
sending instructions to apply brakes on the vehicle upon determining that a second distance between the vehicle and a second vehicle located immediately in front of the vehicle is less than a second value of a minimum distance.

8. An apparatus for operating a vehicle comprising a processor, configured to implement a method comprising:
receive an image provided by a camera located on or in the vehicle operating on a road;
perform a first determination, from the image, that a number of lane markers located on the road within a distance from a location of the vehicle is less than a threshold value;
adjust, in response to the first determination, a first set of one or more values of one or more variables associated with a driving related operation of the vehicle, wherein the first set of one or more values are adjusted to be same as a second set of one or more values associated with a bad visibility condition; and
cause the driving related operation of one or more devices located in the vehicle based on at least the first set of one or more values, wherein the cause the driving related operation causes the vehicle to be driven to a destination;
wherein the second set of one or more values associated with the bad visibility condition indicates that the vehicle is to avoid driving on a route without traffic lights on a local road.

9. The apparatus of claim 8, wherein a value associated with the distance in front of the vehicle is pre-determined.

10. The apparatus of claim 8, wherein the camera points to an area located in front of the vehicle.

11. The apparatus of claim 8, wherein second set of one or more values associated with the bad visibility condition indicates that a headlight of the vehicle is to be turned on.

12. The apparatus of claim 8, wherein the second set of one or more values indicates that the vehicle is only allowed to perform a lane change in an emergency.

13. The apparatus of claim 8, wherein the second set of one or more values associated with the bad visibility condition is based on a total weight of the vehicle.

14. A non-transitory computer readable program storage medium having code stored thereon, the code, when executed by a processor, causing the processor to implement a method comprising:
receiving, by a computer located in the vehicle, an image provided by a camera located on or in the vehicle operating on a road;
performing a first determination, from the image, that a number of lane markers located on the road within a distance from a location of the vehicle is less than a threshold value;
adjusting, in response to the first determination, a first set of one or more values of one or more variables associated with a driving related operation of the vehicle, wherein the first set of one or more values are adjusted to be same as a second set of one or more values associated with a bad visibility condition; and
causing the driving related operation of one or more devices located in the vehicle based on at least the first set of one or more values, wherein the causing the driving related operation causes the vehicle to be driven to a destination;
wherein the second set of one or more values associated with the bad visibility condition indicates that the vehicle is to avoid driving on a route without traffic lights on a local road.

15. The non-transitory computer readable program storage medium of claim 14, wherein the first set of one or more values of the one or more variables associated with the driving related operation of the vehicle are adjusted using a pre-determined table.

16. The non-transitory computer readable program storage medium of claim 15, wherein the pre-determined table includes a list of pre-determined variables and a list of pre-determined values associated with the pre-determined variables for both a good visibility condition and the bad visibility condition.

17. The non-transitory computer readable program storage medium of claim 14, wherein the second set of one or more values associated with the bad visibility condition is based on a number of lanes on the road.

18. The non-transitory computer readable program storage medium of claim 14, wherein the driving related operation is based on the first set of one or more values and a number of vehicles located within a pre-determined distance of the vehicle.

19. The non-transitory computer readable program storage medium of claim 18, wherein the first set of one or more values indicates that the vehicle is to operate in a particular lane on the road in response to the number of vehicles being greater than a second threshold value.

* * * * *